United States Patent
Hayashi

(10) Patent No.: US 11,772,941 B2
(45) Date of Patent: Oct. 3, 2023

(54) CRANE VEHICLE

(71) Applicant: TADANO LTD., Kagawa (JP)

(72) Inventor: Hiroyuki Hayashi, Kagawa (JP)

(73) Assignee: TADANO LTD., Kagawa (JP)

( * ) Notice: Subject to any disclaimer, the term of this patent is extended or adjusted under 35 U.S.C. 154(b) by 229 days.

(21) Appl. No.: 17/049,654

(22) PCT Filed: Apr. 12, 2019

(86) PCT No.: PCT/JP2019/016057
§ 371 (c)(1),
(2) Date: Oct. 22, 2020

(87) PCT Pub. No.: WO2019/208283
PCT Pub. Date: Oct. 31, 2019

(65) Prior Publication Data
US 2021/0179397 A1    Jun. 17, 2021

(30) Foreign Application Priority Data

Apr. 27, 2018  (JP) .................................. 2018-086149

(51) Int. Cl.
*B60R 1/23*     (2022.01)
*G06V 20/56*    (2022.01)
(Continued)

(52) U.S. Cl.
CPC ............... *B66C 23/42* (2013.01); *B60R 1/23* (2022.01); *B66C 15/065* (2013.01); *G06T 7/20* (2013.01);
(Continued)

(58) Field of Classification Search
CPC ....... B66C 23/88; B66C 23/905; B66C 15/06; B66C 15/065; B60R 1/23
See application file for complete search history.

(56) References Cited

U.S. PATENT DOCUMENTS

2006/0013480 A1   1/2006  Sano
2012/0327239 A1  12/2012  Inoue et al.
(Continued)

FOREIGN PATENT DOCUMENTS

EM   2757782 A1   7/2014
EP   2631696 A2   8/2013
(Continued)

OTHER PUBLICATIONS

JP 2014/224410 A Machine Translation. (Year: 2014).*
(Continued)

*Primary Examiner* — Michael R Mansen
*Assistant Examiner* — Juan J Campos, Jr.
(74) *Attorney, Agent, or Firm* — MARSHALL, GERSTEIN & BORUN LLP

(57) ABSTRACT

A crane vehicle achieves safe movement by reliably detecting an obstacle in a region which is a blind spot from the opposite side of the driver seat across a boom. The crane vehicle includes an obstacle sensor which is a transmission/reception antenna that transmits a detection wave and receives the detection wave reflected from the obstacle. A signal corresponding to the reflected wave received by the obstacle sensor is amplified and input to a controller, which calculates the position and the size of the obstacle on the basis of the signal. The controller generates an obstacle display image and displays the image on a display, the obstacle display image including a vehicle object that represents a crane vehicle and an obstacle object which is an object corresponding to the calculated size of the obstacle and which is disposed at a position corresponding to the calculated position of the obstacle.

7 Claims, 12 Drawing Sheets

(51) Int. Cl.
  *H04N 7/18* (2006.01)
  *G06T 7/20* (2017.01)
  *B66C 23/42* (2006.01)
  *B66C 15/06* (2006.01)
  *B66C 23/70* (2006.01)
(52) U.S. Cl.
  CPC ............ *G06V 20/56* (2022.01); *H04N 7/181* (2013.01); *B60R 2300/301* (2013.01); *B66C 23/702* (2013.01); *B66C 2700/0357* (2013.01)

(56) References Cited

U.S. PATENT DOCUMENTS

| | | | |
|---|---|---|---|
| 2013/0222594 A1* | 8/2013 | Kiyota | G06T 3/4038 348/148 |
| 2014/0267731 A1* | 9/2014 | Izumikawa | B60R 1/00 348/148 |
| 2014/0362220 A1* | 12/2014 | Izumikawa | G01S 17/89 348/148 |
| 2017/0284069 A1* | 10/2017 | Machida | B60R 1/00 |
| 2017/0298595 A1* | 10/2017 | Machida | E02F 9/26 |
| 2018/0258616 A1* | 9/2018 | Kiyota | E02F 9/267 |
| 2019/0116315 A1 | 4/2019 | Satomi et al. | |

FOREIGN PATENT DOCUMENTS

| | | |
|---|---|---|
| EP | 2978213 A1 | 1/2016 |
| JP | 2000-344465 A | 12/2000 |
| JP | 2003-238077 A | 8/2003 |
| JP | 2013-120176 A | 6/2013 |
| JP | 2014224410 A | 12/2014 |
| JP | 2016013889 A | 1/2016 |
| JP | 2016-60312 A | 4/2016 |
| JP | 2017142585 A | 8/2017 |
| JP | 2018-042207 A | 3/2018 |
| JP | 2018-50277 A | 3/2018 |
| WO | WO-2011/145141 A1 | 11/2011 |
| WO | WO-2017094626 A1 | 6/2017 |

OTHER PUBLICATIONS

JP 2017/142585 A Machine Translation. (Year: 2017).*
International Search Report issued in PCT Patent Application No. PCT/JP2019/016057 dated Jul. 9, 2019.
European Search Report issued in European Patent Application No. 19791750 dated Mar. 1, 2022.
Office Action issued in Chinese Patent Application No. 201980023933.3 dated Feb. 23, 2022.
Office Action issued in Japanese Patent Application No. 2018-086149 dated Mar. 1, 2022.
Office Action issued in India Application No. 202027048706, dated Mar. 31, 2022.
International Preliminary Report on Patentability issued in PCT Patent Application No. PCT/JP2019/016057 dated Oct. 27, 2020.

* cited by examiner

CRANE VEHICLE

TECHNICAL FIELD

The present invention relates to a self-traveling crane vehicle.

BACKGROUND

A self-traveling crane vehicle includes a traveling body and a crane device mounted on the traveling body. The crane device is supported by the traveling body through a swivel base, and the swivel base may be provided with a driver seat.

Japanese Patent No. 2003-238077 discloses a crane vehicle in which an ultrasonic sensor is arranged at a front end of a boom of a crane device. The ultrasonic sensor irradiates ultrasonic waves forward in the traveling direction of a traveling body, receives a reflected wave reflected by an object to be detected, and detects the distance to the object to be detected. Accordingly, it is determined whether the object to be detected is an obstacle during traveling or crane work of the crane vehicle.

Meanwhile, the crane device is mounted at the centre of the traveling body, and the driver seat is arranged on one side (for example, the right side of the traveling body) in the width direction of the traveling body. Thus, during traveling or during crane work, the other side in the width direction (for example, the left side of the traveling body) becomes a blind spot for the operator.

In the crane vehicle described in Japanese Patent No. 2003-238077, obstacles cannot be sufficiently detected in the region which is a blind spot from the driver seat.

SUMMARY OF INVENTION

The present invention has been made based on the above background and an objective thereof is to provide a crane vehicle that achieves safe movement by reliably detecting an obstacle in a region which is a blind spot from a driver seat, namely, a region on the opposite side of the driver seat across a crane device.

(1) The crane vehicle according to the present invention includes a traveling body on which a crane device is mounted, a driver seat arranged on one side in a width direction of the traveling body, a first sensor that outputs a signal corresponding to a distance to an obstacle located on the other side in the width direction, a controller, and a display. The controller displays an obstacle display image including a first object that represents a picture of the crane vehicle stored in a memory and a second object that represents a picture of the obstacle detected by the first sensor on the display. The distance between the first object and the second object corresponds to the distance detected by the first sensor.

Because the obstacle display image including the first object and the second object is displayed on the display, the operator of the crane vehicle can easily recognize the position of the obstacle with respect to the crane vehicle. In addition, because the distance between the first object that represents the crane vehicle and the second object that represents the obstacle corresponds to the distance detected by the first sensor, the operator can easily recognize the distance from the crane vehicle to the obstacle.

(2) The controller sets the color of the second object to a first predetermined color when the distance to the obstacle is equal to or greater than a threshold distance stored in the memory, and sets the color of the second object to a second predetermined color different from the first predetermined color when the distance to the obstacle is less than the threshold distance stored in the memory.

When an obstacle approaches, the color of the obstacle is changed from the first predetermined color to the second predetermined color, thus enabling the operator to instantly recognize that the obstacle is approaching.

(3) The crane vehicle according to the present invention may further include an input device. The controller receives, through the input device, a selection of one image from a bird's-eye view image viewed from above, a front image of a viewpoint directed forward, and a side image directed toward the other side, and displays the received image on the display as the obstacle display image.

According to the above configuration, an image that the operator feels easy to see can be displayed on the display.

(4) The controller may receive an enlargement instruction instructing the enlargement of a partial region of the obstacle display image through the input device, and displays, in response to reception of the enlargement instruction, an enlarged image obtained by enlarging the region on the other side in the width direction of the traveling body on the display.

When an operator inputs an enlargement instruction through the input device, a region which is a blind spot from the driver seat is enlarged and displayed on the display. That is, the region which is a blind spot from the driver seat is enlarged without prompting the operator to designate the region to be enlarged. Thus, operation of the driver is facilitated.

(5) The crane device according to the present invention may further have a speaker. The controller causes the speaker to generate a warning sound when the distance to the obstacle is less than the threshold distance stored in the memory.

The sound also notifies that the obstacle is approaching. Thus, the operator can recognize the approaching of the obstacle more reliably.

(6) The driver seat has a steering wheel for determining the steering angle of the wheels of the traveling body. The crane device may further include a second sensor for outputting a signal that corresponds to the steering angle of the steering wheel and a third sensor for outputting a signal that corresponds to the speed of the traveling body. The controller determines whether the obstacle detected by the first sensor is a moving object or a fixed object from the signals input from the first sensor, the second sensor, and the third sensor, and sets the second predetermined color to a third predetermined color different from the second predetermined color in response to a determination that the object is a moving object.

If the distance from the crane vehicle to the obstacle is short and the obstacle is a moving object, the color of the first object is changed from the second predetermined color to the third predetermined color different from the second predetermined color. Therefore, the operator can easily recognize that the obstacle requires more attention.

(7) The crane device has a boom that can be raised, lowered and stretched. The first sensor is arranged at the front end of the boom. In response to reception of a signal output from the first sensor and corresponding to the distance from the front end of the boom to a load suspended by the boom, the controller may display the distance on the display.

The distance from the front end of the boom to the load suspended by the boom can be detected by the first sensor configured to detect an obstacle during movement of the crane vehicle, and the distance can be displayed on the display.

(8) The crane vehicle according to the present invention may further include a fourth sensor for receiving infrared rays incident from the other side in the width direction. The controller determines whether the obstacle detected by the first sensor is a person or not in accordance with a signal input from the fourth sensor, and sets the second predetermined color to a fourth predetermined color different from the second predetermined color in response to a determination that the obstacle is a person.

When the distance from the crane vehicle to the obstacle is short and the obstacle is a person, the color of the first object is changed from the second predetermined color to the fourth predetermined color different from the second predetermined color. Therefore, the operator can easily recognize that the obstacle requires more attention.

(9) The crane vehicle according to the present invention may further include a plurality of cameras for capturing images of the periphery of the traveling body. The obstacle display image includes the images captured by the cameras.

This enables the driver (manipulator) to recognize the situation around the crane vehicle as well.

Advantageous Effects of Invention

According to the present invention, safe movement can be achieved by reliably detecting an obstacle in a region which is a blind spot from a driver seat, namely, a region on the opposite side from the driver seat across a crane device.

DETAILED DESCRIPTION OF EMBODIMENTS

Hereinafter, a preferred embodiment of the present invention is described with reference to the drawings as appropriate. Moreover, the present embodiment is only one aspect of the present invention, and it is evident that the embodiment may be changed without changing the gist of the present invention.

Figure 1:
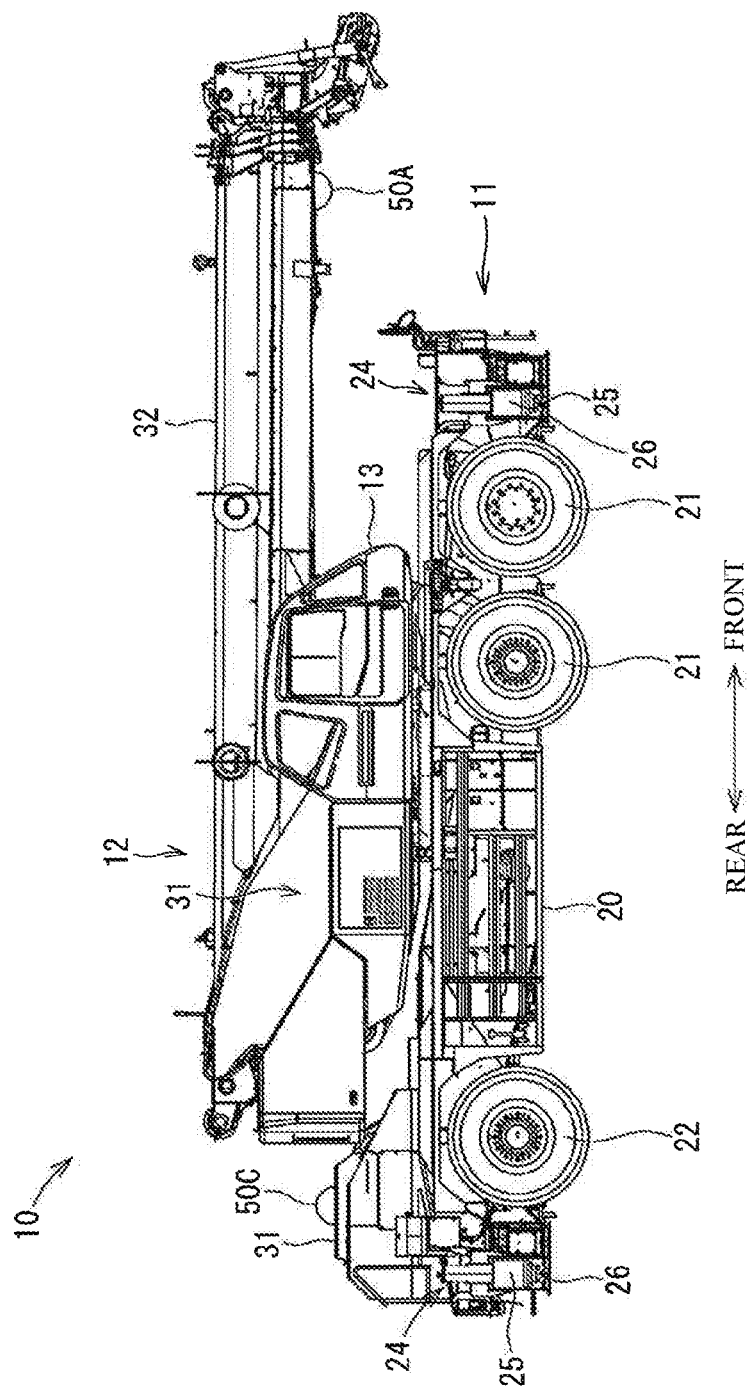
FIG. 1 is a right side view of a crane vehicle 10 according to an embodiment.

A crane vehicle 10 of the present embodiment is shown in FIG. 1. The crane vehicle 10 mainly includes a traveling body 11, a crane device 12 mounted on the traveling body 11, and a cabin 13 for an operator who drives the traveling body 11 and manipulates the crane device 12 to sit in. That is, the crane vehicle 10 is a rough terrain crane in which the driving of the traveling body 11 and the manipulation of the crane device 12 are performed in the cabin 13.

In a rough terrain crane, a crane device is equipped on a moving body, a vehicle body is long, and only one cabin is arranged, thus making the range of the blind spot from the operator wider than in general vehicles. In the present embodiment, the crane vehicle 10 that can be safely driven and manipulated is described.

Traveling Body 11

The traveling body 11 mainly includes a vehicle body 20, an engine (not shown) mounted on the vehicle body 20, a pair of left and right rear wheels 22 that are rotationally driven by the engine, and four steerable front wheels 21. The front wheels 21 and the rear wheels 22 are rotatably held by the vehicle body 20. The front wheels 21 and the rear wheels 22 correspond to the "wheels" of the present invention.

During normal travelling of travelling on a road or the like, the direction of the traveling body 11 is changed by steering the front wheels 21.

In addition, the traveling body 11 includes a hydraulic pump (not shown) mounted on the vehicle body 20, and a swivel base motor 23 (FIG. 4) being a hydraulic motor driven by hydraulic oil supplied from the hydraulic pump. The swivel base motor 23 swings a swivel base 31 of the crane device 12. The hydraulic pump supplies hydraulic oil to various hydraulic cylinders and hydraulic motors included in the crane device 12 in addition to the swivel base motor 23.

Hereinafter, the width direction of the crane vehicle 10 is described as the left-right direction, and the direction in which the crane vehicle 10 advances during normal traveling is described as the front.

The traveling body 11 includes a pair of front and rear outriggers 24 for stabilizing the posture of the crane vehicle 10 during operation. The outrigger 24 includes an outer cylinder (not shown) fixed to the vehicle body 20 and extending in the left-right direction, a pair of left and right inner cylinders (not shown) held by the outer cylinder so as to be slidable in the left-right direction, and a pair of left and right jacks 25 arranged at the front ends of the inner cylinders. The jack 25 is a jack cylinder capable of stretching and contracting in the up-down direction. A ground plate 26 is arranged at the lower end of the jack 25. The jack 25 is pulled out from the vehicle body 20 by the hydraulic cylinder (not shown) and then extended to ground the ground plate 26 to an iron plate or the like placed on the ground.

When the crane vehicle 10 is moved, the jacks 25 are brought into a housed state in which the jacks 25 are close to the vehicle body 20, and the crane vehicle 10 is supported by the front wheels 21 and the rear wheels 22. On the other hand, during working, the crane vehicle 10 is supported by the four jacks 25 that are pulled out and extended.

In addition, the traveling body 11 includes a battery 27 (FIG. 4) that is charged by driving the engine. The battery 27 supplies a direct-current voltage to a power supply circuit 65 described later.

Crane Device 12

The crane device 12 includes a swivel base 31 swivably supported by the vehicle body 20, and a boom 32 supported by the swivel base 31 so as to be capable of rising up and falling down.

The swivel base 31 is located on the upper surface of substantially the central portion of the vehicle body 20 in the front-rear direction. The swivel base 31 is swivably supported by, for example, a swing bearing (not shown) arranged in the vehicle body 20. The swivel base 31 is rotated by the swivel base motor 23 arranged in the vehicle body 20.

A swivel (not shown) is arranged between the vehicle body 20 and the swivel base 31 so as to circulate hydraulic oil, cooling water, or electricity (power and signals) between the vehicle body 20 and the swivel base 31. Because the structure of the swivel is publicly known, detailed description thereof is omitted.

The boom 32 is located on the left side of the swivel base 31 and is supported by the swivel base 31 so as to be capable of rising up and falling down. The boom 32 is made to rise up and fall down by a derricking cylinder 33 (FIG. 4) arranged between the swivel base 31 and the boom 32. The derricking cylinder 33 is a hydraulic cylinder, and stretches and contracts when the hydraulic oil is supplied through the swivel from the hydraulic pump arranged in the vehicle body 20.

The boom 32 has a plurality of frames arranged in a nested manner and is capable of stretching and contracting. The boom 32 is provided with a telescopic cylinder 34 that moves the frame. The telescopic cylinder 34 is a hydraulic cylinder and stretches and contracts when the hydraulic oil is supplied through the swivel from the hydraulic pump arranged in the vehicle body 20.

Figure 4:
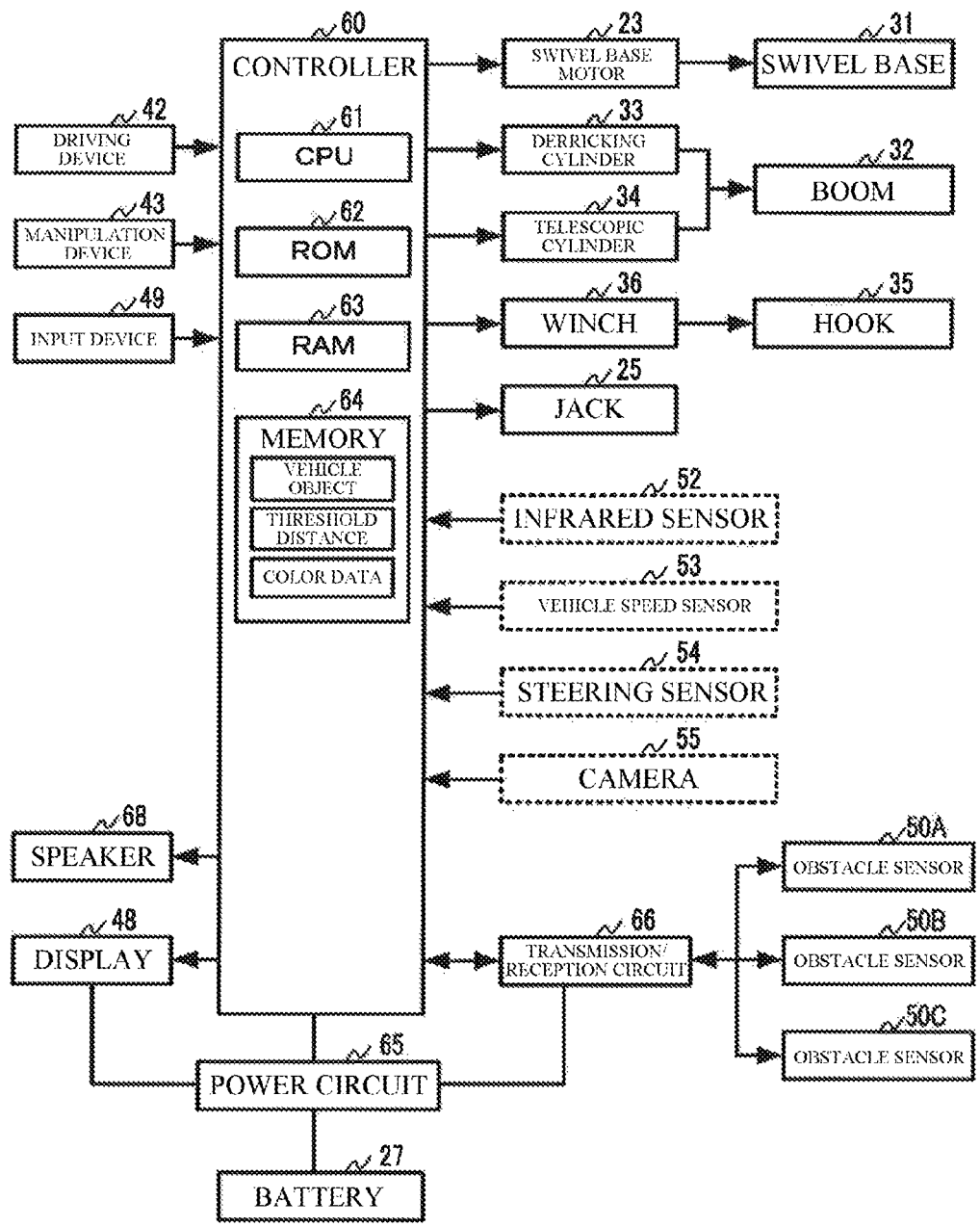
FIG. 4 is a functional block diagram of the crane 10 according to the embodiment.

A hook 35 (FIG. 4) connected to one end of a wire is arranged at the front end of the boom 32. The other end of the wire is connected to a winch 36 (FIG. 4). The winch 36 is driven by supplying the hydraulic oil from the hydraulic pump through the swivel. The hook 35 is lifted and lowered by driving the winch 36.

FIG. 1 shows a state of the crane vehicle 10 during normal traveling or during moving at a work site (hereinafter, referred to as a moving state). In the moving state, the boom 32 is contracted and laid down. The front end of the boom 32 in the moving state projects forward from the front surface of the vehicle body 20. Hereinafter, the boom 32 is assumed to be in the posture in the moving state unless otherwise specified.

The cabin 13 is located on the upper surface of the right part of the swivel base 31. That is, the cabin 13 is aligned with the boom 32 in the left-right direction. Therefore, in the moving state, the left side of the crane vehicle 10 becomes a blind spot from the operator sitting in the cabin 13.

Figure 2:
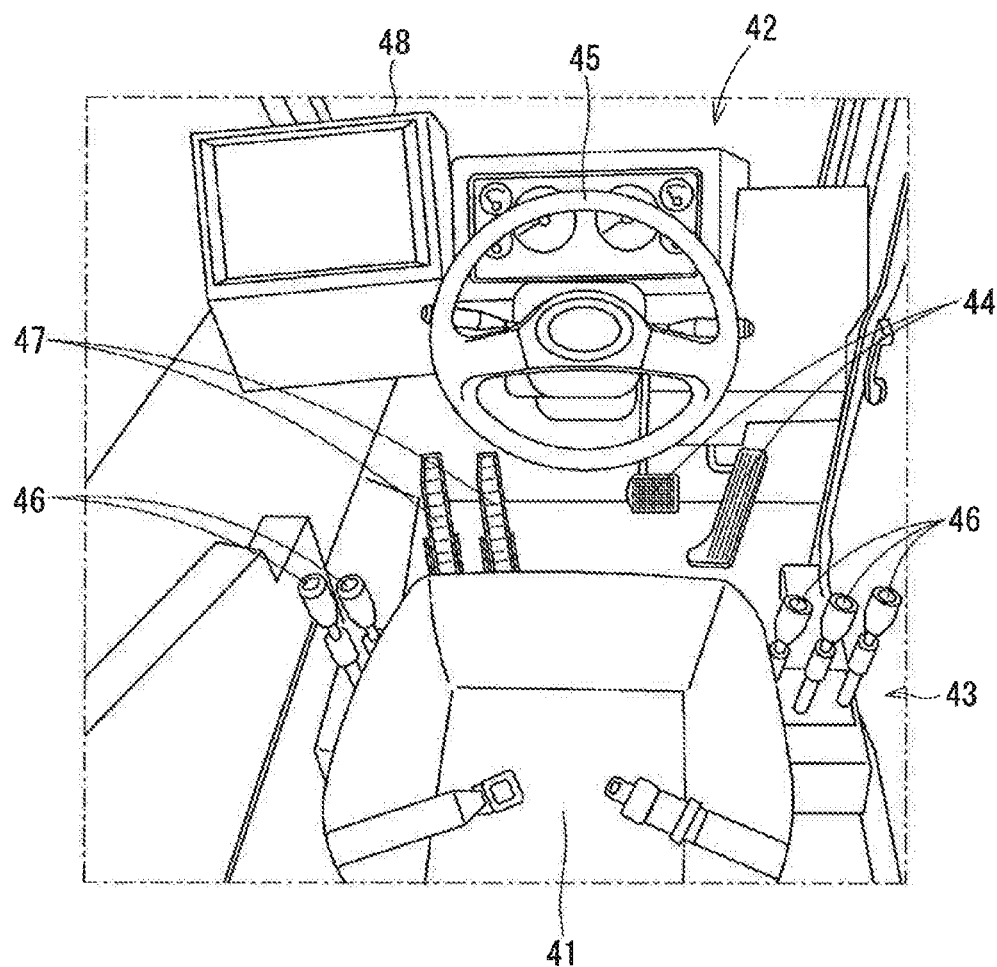
FIG. 2 is a schematic view of the inside of a cabin 13.

The cabin 13 has a substantially rectangular box shape. As shown in FIG. 2, a driver seat 41 on which an operator sits, a driving device 42, a manipulation device 43, a display 48, an input device 49 (FIG. 4) used for switching the display of the display 48 and the like, and a control box (not shown) are housed in the inner space of the cabin 13.

The driving device 42 is used for driving the traveling body 11. The driving device 42 mainly includes a plurality of pedals 44 and a steering wheel 45. The pedal 44 is an input unit for receiving an instruction to accelerate or decelerate the traveling body 11, and is an accelerator pedal, a brake pedal, a clutch pedal, or the like. The steering wheel 45 is an input unit for receiving an instruction to change the steering angle of the front wheels 21 of the traveling body 11. Because the configuration of the driving device 42 is publicly known, detailed description thereof is omitted.

The manipulation device 43 is used to manipulate the crane device 12. Specifically, the operator's instructions of stretching/contracting the jacks 25 of the outrigger 24, swinging the swivel base 31, stretching or contracting the boom 32, raising or lowering the boom 32, and driving the winch 36 are received. The manipulation device 43 is configured of, for example, a lever 46, a pedal 47, a switch (not shown), or the like. Because the configuration of the manipulation device 43 is publicly known, detailed description thereof is omitted.

The display 48 is arranged in the cabin 13 at a position deviated to the left from the centre in the left-right direction. More specifically, the display 48 is arranged on the left side of the steering wheel 45. Power is supplied to the display 48 from a power supply circuit 65 described later and an image signal is input to the display 48 from a controller 60 described later. The display 48 displays an image corresponding to the input image signal. Specifically, the display 48 displays a stretching state of the jacks 25, a swiveling angle of the swivel base 31, a stretching state (length) of the boom 32, a derricking angle of the boom 32, and an obstacle detected by an obstacle sensor 50 described later.

The input device 49 has one or a plurality of operation units such as push buttons operated by the operator. Alternatively, the input device 49 has a touch sensor superimposed on the display 48. The input device 49 receives at least an instruction to select an obstacle display mode for displaying an obstacle image in a moving state, an instruction to select an image between a bird's-eye view image and a front image, an instruction to select an enlarged display of an image, or the like.

A control substrate is housed in the control box (not shown). A resistor, an integrated circuit, a diode, a capacitor, or a microcomputer that realizes the controller 60, the power supply circuit 65 and a transmission/reception circuit 66 shown in FIG. 4 are mounted in the control substrate.

The power supply circuit 65 is electrically connected to the battery 27 through a cable and a swivel, and is supplied with a direct-current voltage from the battery 27. The power supply circuit 65 has a DC/DC converter such as a switching regulator to convert the supplied direct-current voltage into a direct-current voltage having a stable predetermined voltage value (12 V, 5 V, 3.3 V, and the like) and outputs the direct-current voltage. The power supply circuit 65 supplies the predetermined direct-current voltage as a drive voltage to the controller 60, the display 48, and the transmission/reception circuit 66.

As shown in FIG. 4, the controller 60 includes a CPU 61, a ROM 62 in which a program is stored, a RAM 63, a memory 64, and a communication bus (not shown). The CPU 61 executes the program by sequentially executing the instructions described in the address of the program stored in the ROM 62. The RAM 63 temporarily stores data and the like when the program is executed. The CPU 61, the ROM 62, the RAM 63, and the memory 64 are connected by the communication bus. Moreover, a vehicle speed sensor 53 and a steering sensor 54, which are indicated by broken lines in FIG. 4, are included in the configuration of Modification example 1 and are described in Modification example 1. In addition, an infrared sensor 52 shown by the broken line in FIG. 4 is included in the configuration of Modification example 3 and is described in Modification example 3. Furthermore, a camera 55 shown by the broken line in FIG. 4 is included in the configuration of Modification example 4 and is described in Modification example 4.

The controller 60 is connected to the driving device 42, the manipulation device 43, the input device 49, the display 48, the speaker 68, and the transmission/reception circuit 66. The controller 60 inputs an operation signal corresponding to the operator's instruction from the driving device 42, the manipulation device 43, and the input device 49. In addition, the controller 60 outputs an image signal to the display 48 and displays an image on the display 48. Furthermore, the controller 60 outputs a control signal to the transmission/reception circuit.

In addition, the controller 60 outputs an audio signal to the speaker 68. The speaker 68 is mounted on, for example, the control substrate. The speaker 68 outputs a sound corresponding to the input audio signal.

Besides, the controller 60 is connected to the swivel base motor 23, the derricking cylinder 33, the telescopic cylinder 34, the winch 36, and a member such as a solenoid valve for controlling the operation of the jacks 25, and controls the operation of the swivel base motor 23, the derricking cylinder 33, the telescopic cylinder 34, the winch 36, and the jacks 25.

The transmission/reception circuit 66 is electrically connected to obstacle sensors 50A, 50B and 50C (described later) through a cable and the swivel. The transmission/reception circuit 66 includes, for example, a transmission circuit for generating a detection wave, an amplifier circuit for amplifying the detection wave generated by the transmission circuit and supplying the amplified detection wave to the obstacle sensor 50 being an antenna, and a detection circuit for generating and amplifying a detection signal corresponding to the radio waves received by the obstacle sensor 50 and outputting the amplified detection signal to the controller 60. The transmission/reception circuit 66 is driven by receiving supply of power (direct-current voltage) from the power supply circuit 65. The transmission/reception circuit supplies the detection wave to the obstacle sensor 50 based on the control signal input from the controller 60, generates and outputs a detection signal.

The memory 64 is a non-volatile memory such as an EEPROM. The memory 64 stores a vehicle object being a schematic picture of the crane vehicle 10. The vehicle object is used to generate an obstacle image described later. In addition, the memory 64 also stores threshold distance and color data. The threshold distance and the color data are used for determining the color of the obstacle in the obstacle image.

Obstacle Sensor 50

Figure 3:
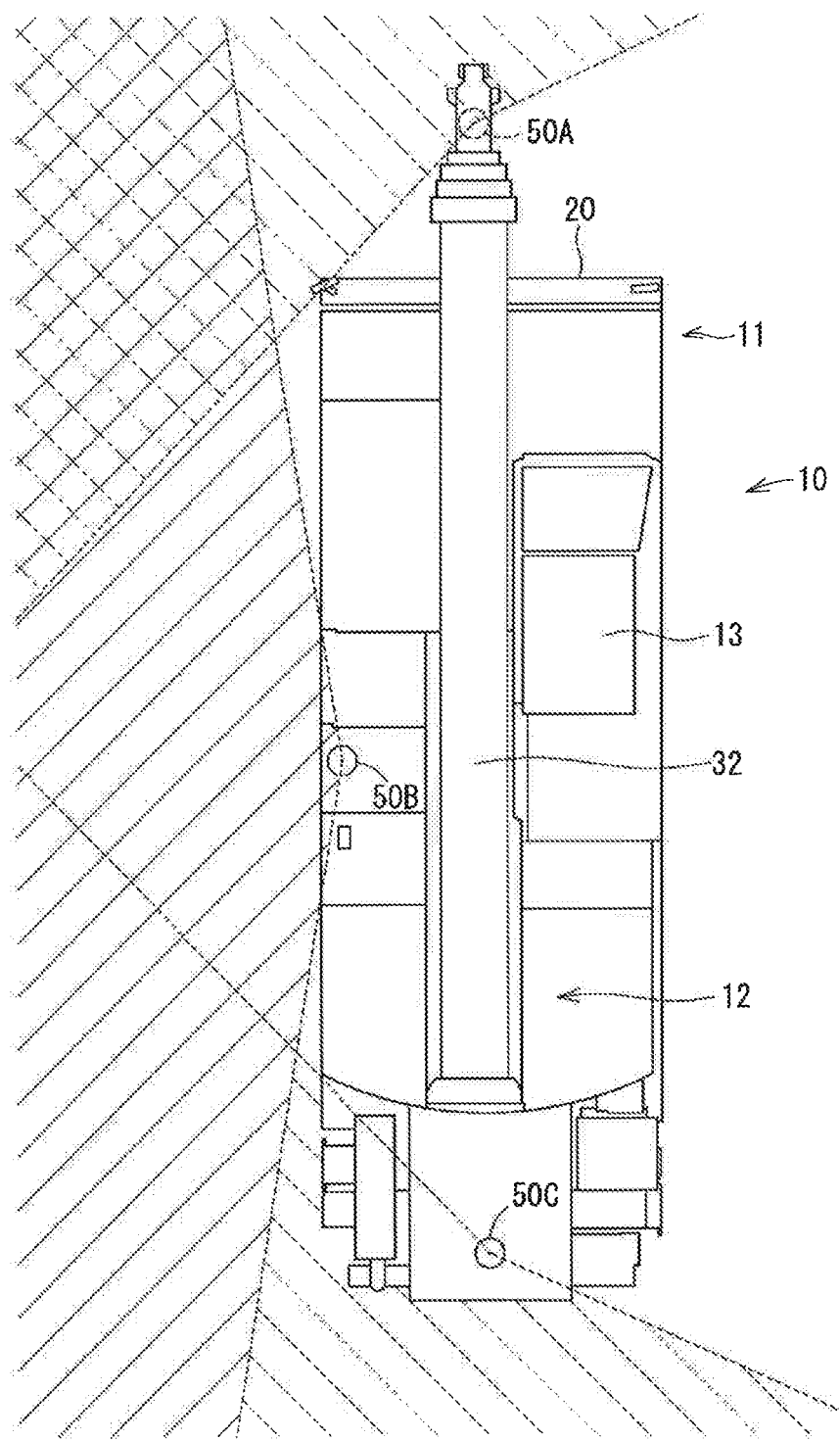
FIG. 3 is a schematic plan view of the crane 10 according to the embodiment.

As shown in FIG. 3, the crane vehicle 10 includes three obstacle sensors 50A, 50B and 50C. As shown in FIG. 1, the obstacle sensor 50A is attached to the lower surface of the front end portion of the boom 32. As shown in FIG. 3, the obstacle sensor 50B is attached to the upper surface of the central portion of the vehicle body 20 in the front-rear direction on the left side of the vehicle body 20. The obstacle sensor 50C is attached to the upper surface of the central portion of the vehicle body 20 in the left-right direction on the rear side of the vehicle body 20. The obstacle sensor 50 corresponds to the "first sensor" of the present invention.

The obstacle sensor 50A arranged on the boom 32 is electrically connected through a cable to the transmission/reception circuit 66 of the control substrate arranged in the cabin 13. The obstacle sensor 50B and the obstacle sensor 50C arranged on the vehicle body 20 are electrically connected through a cable (not shown) and the swivel to the transmission/reception circuit 66 of the control substrate arranged in the cabin 13.

Hereinafter, when the obstacle sensors 50A, 50B and 50C are not distinguished, they are described as the obstacle sensor 50.

The obstacle sensor 50 is a transmission/reception antenna for transmitting and receiving radio waves. The obstacle sensor 50 transmits radio waves (detection wave) through the transmission/reception circuit 66 and receives radio waves (detection wave) reflected by the obstacle.

The obstacle sensor 50 being an antenna has directivity. In FIG. 3, the directivity of the obstacle sensor 50 is shown by hatching. The obstacle sensor 50A mainly transmits radio waves toward the front and the left side of the crane vehicle 10, and receives radio waves incident from the front and the left side of the crane vehicle 10 with high sensitivity. That is, the obstacle sensor 50A detects obstacles on the left side of the vehicle body 20 and in front of the vehicle body 20, which are blind spots from the cabin 13.

The obstacle sensor 50B mainly transmits radio waves toward the left side of the crane vehicle 10 and receives radio waves incident from the left side of the crane vehicle 10 with high sensitivity. That is, the obstacle sensor 50B detects obstacles on the left side of the vehicle body 20, which is a blind spot from the cabin 13.

The obstacle sensor 50C mainly transmits radio waves toward the left side and the rear side of the crane vehicle 10 and receives radio waves incident from the left side and the rear side of the crane vehicle 10 with high sensitivity. That is, the obstacle sensor 50C detects obstacles on the left side of the vehicle body 20 and on the rear side of the vehicle body 20, which are blind spots from the cabin 13.

Display Processing

Hereinafter, display processing in which the controller 60 displays an image on the display 48 when the crane vehicle is in the moving state is described with reference to FIG. 5. Moreover, the execution order of each processing (each step) described below can be appropriately changed without changing the gist of the invention.

The controller 60 uses the input device 49 to determine whether the operator has selected the obstacle display mode (S11). Specifically, the controller 60 determines whether a start signal has been input from the input device 49. That is, the display processing is started when the operator has selected the obstacle display mode.

The controller 60 waits until the start signal is input (S11: No). When the controller 60 determines that the start signal has been input (S11: Yes), the controller 60 executes the obstacle detection processing (S12). Details of the obstacle detection processing are described with reference to FIG. 6.

Obstacle Detection Processing

First, the controller 60 outputs a control signal to the transmission/reception circuit 66 (S31), and causes the transmission/reception circuit 66 to transmit a detection wave from the obstacle sensor 50. The transmitted detection wave is reflected by the obstacle. The detection wave (reflected wave) reflected by the obstacle is received by the obstacle sensor 50. The reflected wave received by the obstacle sensor 50 is processed by the transmission/reception circuit 66 and output to the controller 60 as a detection signal. Because the processing performed by the transmission/reception circuit 66 is publicly known, detailed description thereof is omitted.

The controller 60 waits until a detection signal is input from the transmission/reception circuit 66 (S32: No). When the detection signal is input (S32: Yes), the controller 60 detects the direction in which the obstacle is located (S33), the distance to the obstacle (S34), and the size of the obstacle (S35), and ends the obstacle detection processing.

For example, the controller 60 calculates the distance to the obstacle, the direction in which the obstacle is located (that is, the position of the obstacle), and the size of the obstacle from a time starting from the transmission of the detection wave by the obstacle sensor 50A until the reception of the reflected wave, a time starting from the transmission of the detection wave by the obstacle sensor 50B until the reception of the reflected wave, the intensity distribution of the received reflected wave with respect to the reception angle (reception direction), and the like. In addition, the controller 60 calculates the distance to the obstacle, the direction in which the obstacle is located (that is, the position of the obstacle), and the size of the obstacle from a time starting from the transmission of the detection wave by the obstacle sensor 50B until the reception of the reflected wave, a time starting from the transmission of the detection wave by the obstacle sensor 50C until the reception of the reflected wave, the intensity distribution of the received reflected wave with respect to the reception angle (reception direction), and the like. Moreover, the detection of the position of the obstacle and the detection of the size of the obstacle are examples only, and other detection methods may also be used.

The controller 60 executes the processing of steps S33, S34 and S35 for all the detected obstacles.

Figure 5:
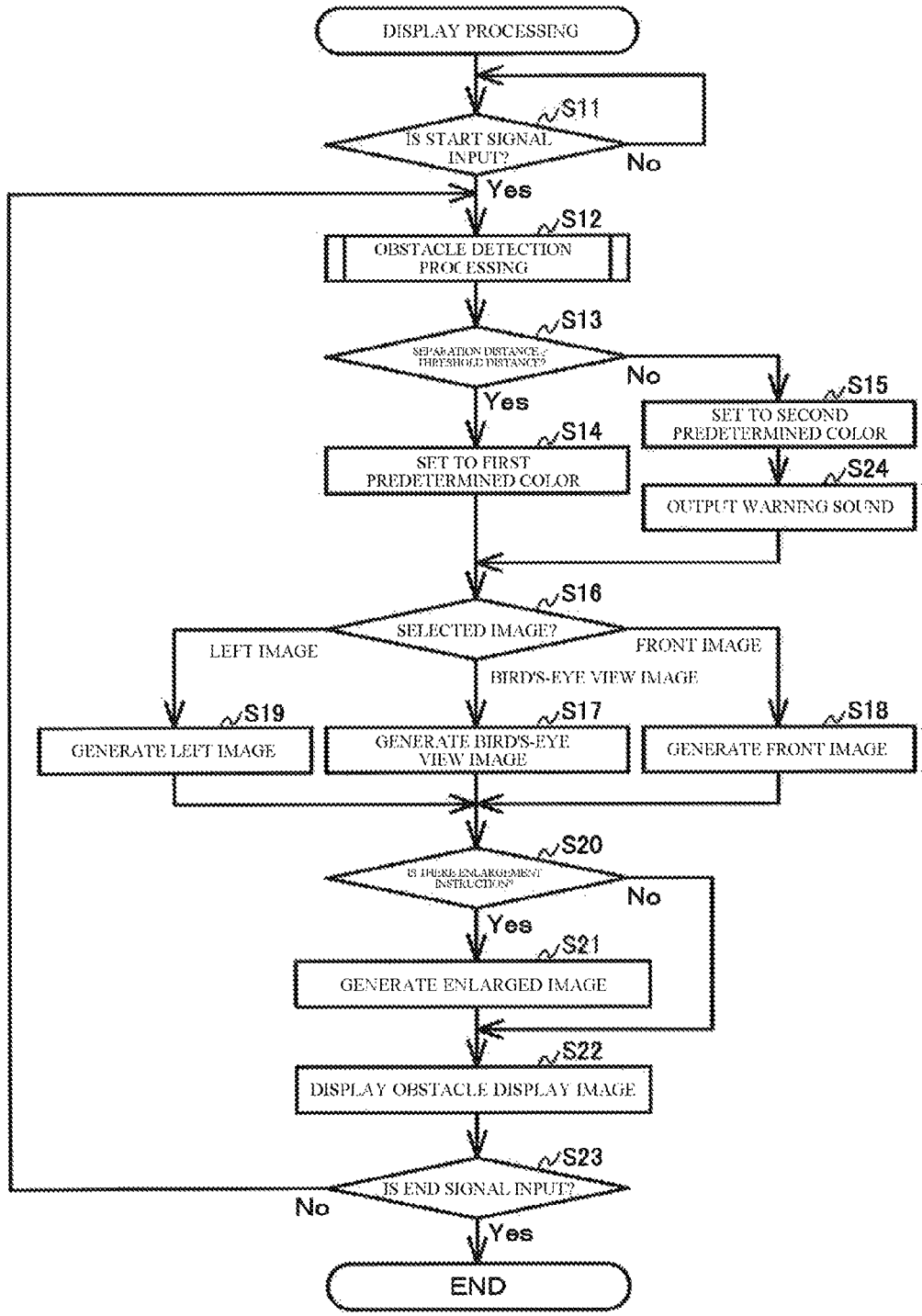
FIG. 5 is a flowchart of display processing.

As shown in FIG. 5, when the obstacle detection processing is ended (S12), the controller 60 determines whether the detected separation distance is equal to or greater than the threshold distance stored in the memory 64 (S13). That is, the controller 60 determines whether the obstacle is close to the crane vehicle 10. When the controller 60 determines that the separation distance is equal to or greater than the threshold distance (S13: Yes), the controller 60 sets the color of the obstacle to a first predetermined color indicated by color data stored in the memory 64 (S14). On the other hand, when the controller 60 determines that the separation distance is not equal to or greater than the threshold distance (S13: No), the controller 60 sets the color of the obstacle to be a second predetermined color indicated by the color data stored in the memory 64 (S15). The second predetermined color is, for example, red or yellow, and the first predetermined color is, for example, green or blue. After the execution of step S15, the controller 60 outputs an audio signal to the speaker 68 and causes the speaker 68 to output a warning sound (S24). That is, when the distance to the obstacle is short, the speaker 68 outputs the warning sound. The controller 60 executes the processing of steps S13 to S15 and S24 for all the detected obstacles.

Subsequently, the controller 60 determines the type of the image selected by the operator using the input device 49 based on the operation signal input from the input device 49 (S16). Specifically, the controller 60 determines whether the type of the image selected by the operator is a "bird's-eye view image", a "front image", or a "left image". The bird's-eye view image is an image captured when the crane vehicle 10 and its surroundings are viewed from above the crane vehicle 10. The front image is an image captured when the front of the crane vehicle 10 is viewed from the crane vehicle 10. The left image is an image captured when the left side of the crane vehicle 10 is viewed from the crane vehicle 10.

Figure 7:
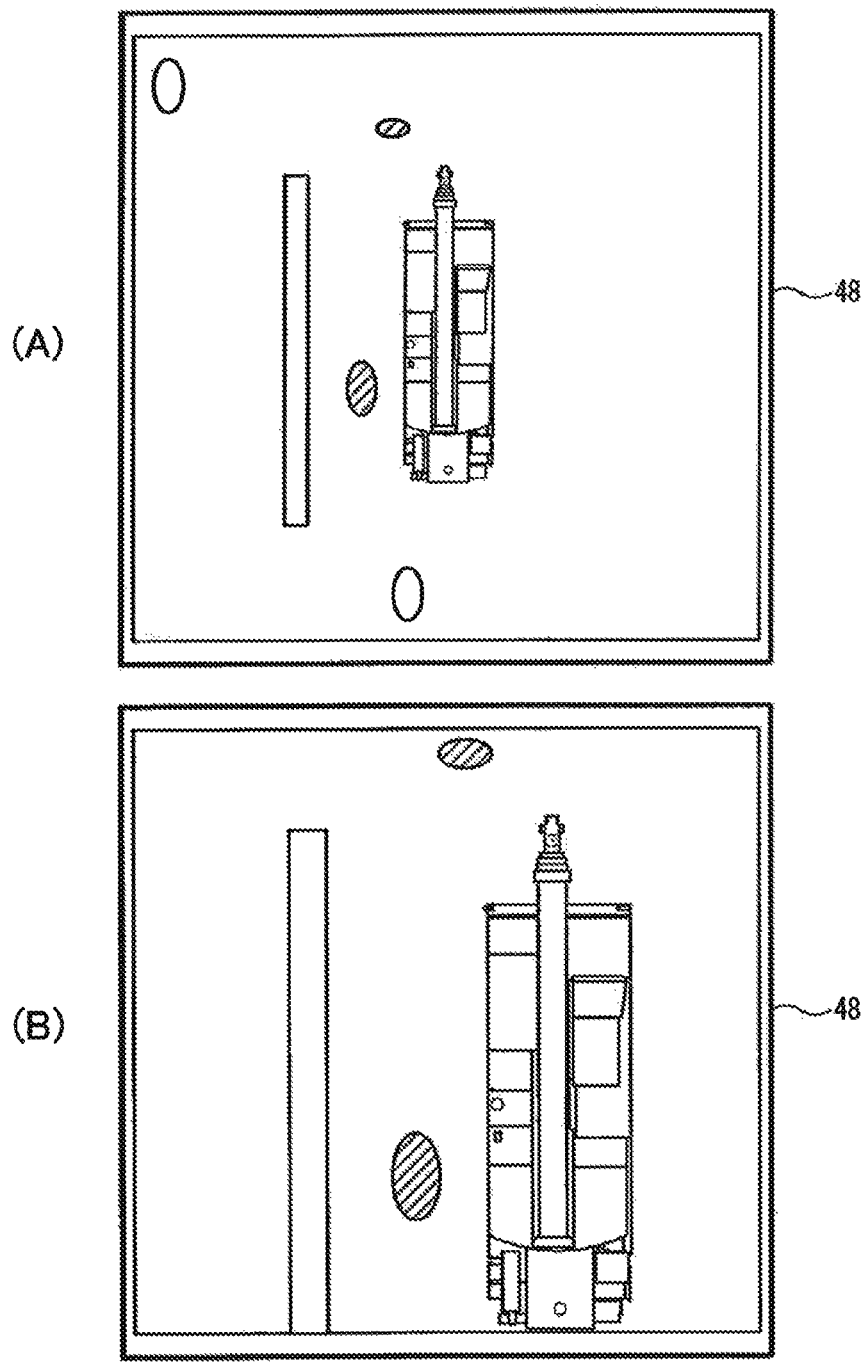
FIG. 7(A) is a diagram showing a bird's-eye view image displayed on a display 48.
FIG. 7(B) is a diagram showing an enlarged bird's-eye view image.

When the controller 60 determines that the type of the image selected by the operator is the "bird's-eye view image" (S16: bird's-eye view image), the controller 60 uses the vehicle object stored in the memory 64 to generate an obstacle display image (FIG. 7(A)) being a bird's-eye view image. More specifically, the controller 60 generates an obstacle display image including the vehicle object stored in the memory 64 and the obstacle object that represents the obstacle detected by the obstacle detection processing. At that time, the controller 60 arranges an obstacle object having a size corresponding to the size of the obstacle detected in the obstacle detection processing at the position (direction and distance) of the obstacle detected in the obstacle detection processing. In addition, the controller 60 generates an obstacle object with the color set in step S14 or S15. The vehicle object corresponds to the "first object" of the present invention. The obstacle object corresponds to the "second object" of the present invention. The image shown in FIG. 7(A) corresponds to the "obstacle display image" of the present invention.

Similarly, when the controller 60 determines that the type of the image selected by the operator is the "front image" (S16: front image), the controller 60 generates an obstacle display image being a front image (S18), and generates an obstacle display image being a left image (S19) when the controller 60 determines that the type of the image selected by is the "left image" (S16: left image). The left image corresponds to the "side image" of the present invention.

After the obstacle display image (S17, S18, S19) is generated, the controller 60 determines whether the operator has instructed to enlarge the image by using the input device 49 (S20). Specifically, the controller 60 determines whether an operation signal indicating the enlargement of the image is input from the input device 49.

When the controller 60 determines that the operation signal indicating the enlargement of the image has been input from the input device 49 (S20: Yes), the controller 60 generates an enlarged image (FIG. 7(B)) obtained by enlarging the generated obstacle display image (S21). The controller 60 enlarges a predetermined region of the obstacle display image to generate the enlarged image. Specifically, the controller 60 generates the enlarged image obtained by enlarging the left region of the crane vehicle 10.

When the controller 60 determines that the operation signal indicating the enlargement of the image has not been input from the input device 49 (S20: No), the processing of step S21 of generating the enlarged image is skipped.

The controller 60 displays the bird's-eye view image generated in step S17, the front image generated in step S18, the left image generated in step S19, or the enlarged image generated in step S21 on the display 48 as an obstacle display image (S22).

Subsequently, the controller 60 determines whether the operator has input an instruction to end the obstacle display mode by using the input device 49 (S23). Specifically, the controller 60 determines whether an end signal has been input from the input device 49. When the controller 60 determines that the end signal has not been input (S23: No), the controller 60 returns to the processing of step S12 and continues the display processing. On the other hand, when the controller 60 determines that the end signal has been input (S23: Yes), the controller 60 ends the display processing.

Operation and Effect of the First Embodiment

In the present embodiment, an image (FIG. 7) including the vehicle object and the obstacle object is displayed on the display 48, so that the operator of the crane vehicle 10 can easily recognize the position of the obstacle with respect to the crane vehicle 10. In addition, the distance between the vehicle object that represents the crane vehicle 10 and the obstacle object that represents the obstacle corresponds to the separation distance detected by the obstacle sensor 50, so that the operator can easily recognize the distance from the crane vehicle 10 to the obstacle.

In addition, in the present embodiment, when the obstacle is far from the crane vehicle 10, the color of the obstacle object is the first predetermined color (for example, blue), and when the obstacle is close to the crane vehicle 10, the color of the obstacle object is the second predetermined color (for example, red), thus enabling the operator to instantly recognize whether the obstacle is close to the crane vehicle 10.

Besides, in the present embodiment, when the obstacle approaches, the color of the obstacle object is changed from the first predetermined color (for example, blue) to the second predetermined color (for example, red), thus enabling the operator to instantly recognize that the obstacle is approaching.

In addition, in the present embodiment, the image selected by the operator from the "bird's-eye view image", the "front image", and the "left image" is displayed on the display 48. Thus, an image that the operator feels easy to see can be displayed on the display.

Besides, in the present embodiment, when the operator inputs an enlargement instruction, the region on the left side of the crane vehicle 10, which is a blind spot from the driver seat 41, is enlarged and displayed on the display 48. That is, the region which is a blind spot from the driver seat 41 is enlarged without prompting the operator to designate the region to be enlarged. Thus, the operation of the operator is facilitated.

Besides, in the present embodiment, the sound output from the speaker 68 also notifies that the obstacle is close to the crane vehicle 10. Thus, the operator can more reliably recognize that the obstacle is close to the crane vehicle 10 or recognize that the obstacle is within the threshold distance.

In addition, in the present embodiment, because the obstacle is detected by radio waves, the obstacle can be reliably detected even when the surroundings are dark such as at night. That is, the obstacle is reliably displayed on the display 48 even when the surroundings are dark such as at night.

Modification Example 1

In this modification example, an example is described in which the controller 60 determines whether the detected obstacle is a moving object that moves or a fixed object that does not move.

The crane vehicle 10 described in this modification example further includes the vehicle speed sensor 53 and the steering sensor 54 shown by broken lines in FIG. 4. The vehicle speed sensor 53 outputs, as a detection signal, pulses of the number (per unit time) in accordance with the vehicle speed of the crane vehicle 10. The steering sensor 54 is, for example, a resolver or an encoder. The steering sensor 54 outputs a signal as a detection signal in accordance with the rotational position (steering angle) of the steering wheel 45. The detection signals output by the vehicle speed sensor 53 and the steering sensor 54 are input to the controller 60. The steering sensor 54 corresponds to the "second sensor" of the present invention. The vehicle speed sensor 53 corresponds to the "third sensor" of the present invention.

Display Processing

Figure 8:
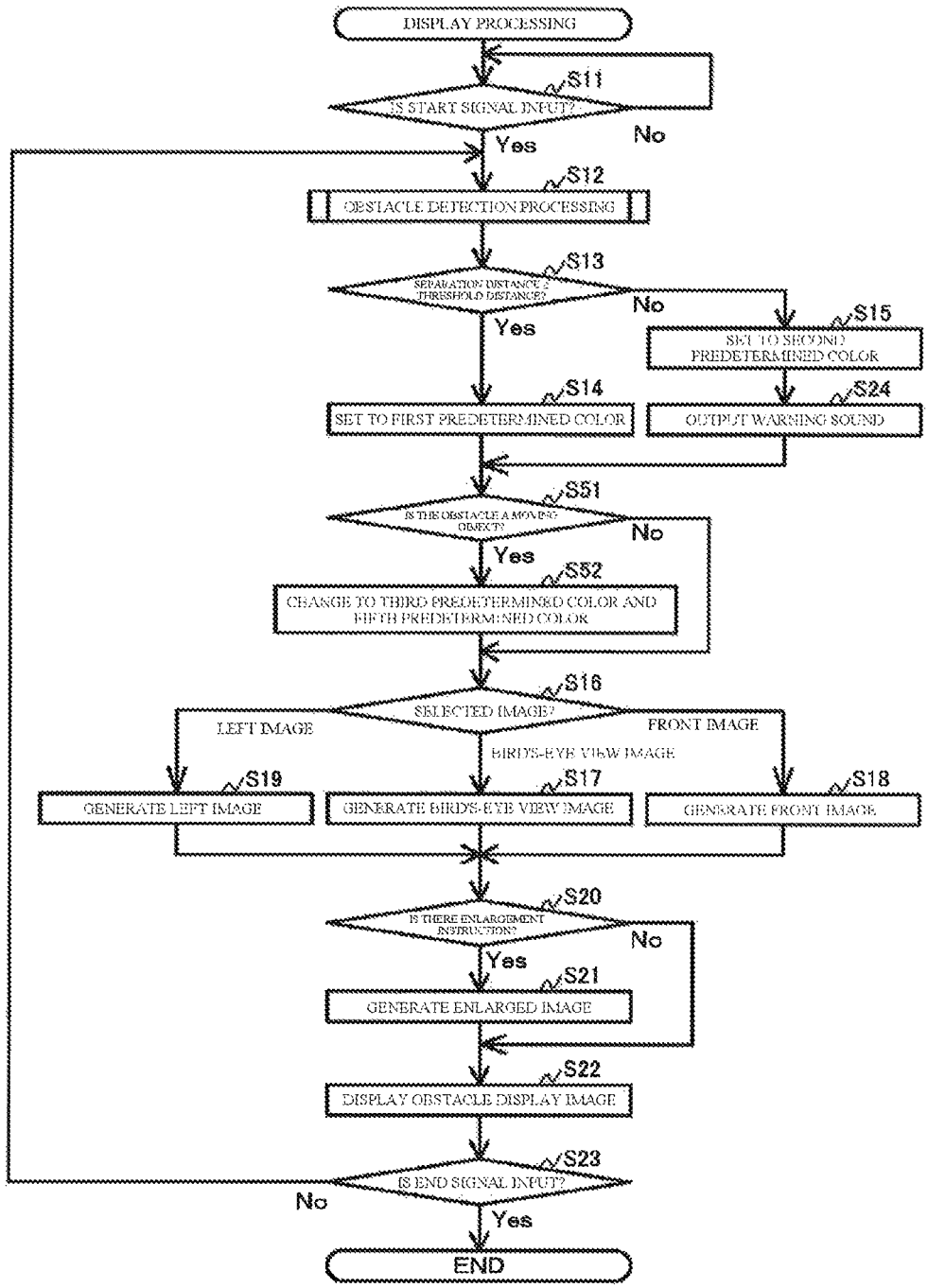
FIG. 8 is a flowchart of display processing of Modification example 1.

In this modification example, the controller 60 executes the display processing shown in FIG. 8 instead of the display processing shown in FIG. 5. Moreover, in the display processing shown in FIG. 8, the same processing as the display processing shown in FIG. 5 is denoted by the same reference characters and the description thereof is omitted.

The controller 60 executes the processing of steps S11 to S15 and S24 as in the above embodiment (the display processing shown in FIG. 5). Subsequently, the controller 60 executes an obstacle determination processing for determining whether the obstacle detected by the obstacle sensor 50 is a moving object or a fixed object (S51).

Specifically, the controller 60 calculates the traveling direction and the vehicle speed (moving speed) of the crane vehicle 10 based on the detection signals input from the vehicle speed sensor 53 and the steering sensor 54. The traveling direction of the crane vehicle 10 is, for example, straight travel, reverse travel, left turn, right turn, or the like. Next, the controller 60 calculates the moving direction and the moving speed of the detected obstacle based on the temporal change in the position of the obstacle detected in the obstacle detection processing (S12). The controller 60 determines that the detected obstacle is a fixed object when the calculated traveling direction and vehicle speed (moving speed) of the crane vehicle 10 coincide with the calculated moving direction and moving speed of the obstacle. On the other hand, the controller 60 determines that the obstacle is a moving object when the calculated traveling direction and vehicle speed (moving speed) of the crane vehicle 10 do not coincide with the calculated moving direction and moving speed of the obstacle. Moreover, the "determination of whether the obstacle is a moving body or a fixed object" described above is an example only and may be performed by other methods.

In response to the determination that the detected obstacle is a moving object (S51: Yes), the controller 60 changes the second predetermined color (for example, yellow) set in step S15 to a third predetermined color (for example, red) different from the second predetermined color and the first predetermined color (for example, blue) (S52). In addition, in response to the determination that the detected obstacle is a moving object (S51: Yes), the controller 60 changes the first predetermined color (for example, blue) set in step S14 to a fifth predetermined color (for example, orange) different from the first predetermined color, the second predetermined color, and the third predetermined color (S52). The third predetermined color and the fifth predetermined color are colors previously stored in the memory 64. On the other hand, the controller 60 skips the processing of step S52 when the detected obstacle is not a moving object (that is, the detected obstacle is a fixed object) (S51: No).

After executing step S52, the controller 60 executes the processing of steps S16 to S23 as in the embodiment described above, and ends the display processing.

Operation and Effect of Modification Example 1

In this modification example, a fixed object such as a wall of a building and a moving object such as a pedestrian, a motorcycle, or a bicycle are displayed with colors changed, thus enabling the user to instantly recognize whether the object is a fixed object or a moving object.

In addition, when the distance from the crane vehicle 10 to the obstacle is short and the obstacle is a moving object, the color of the obstacle object is changed from the second predetermined color (for example, yellow) to the third predetermined color (for example, yellow), thus enabling the user to easily recognize that more attention is required.

Modification Example 2

In this modification example, an example is described in which the obstacle sensor 50A is used to detect obstacles around a load suspended by the hook 35 or a distance to the suspended load during the operation of the crane device 12.

Figure 9:
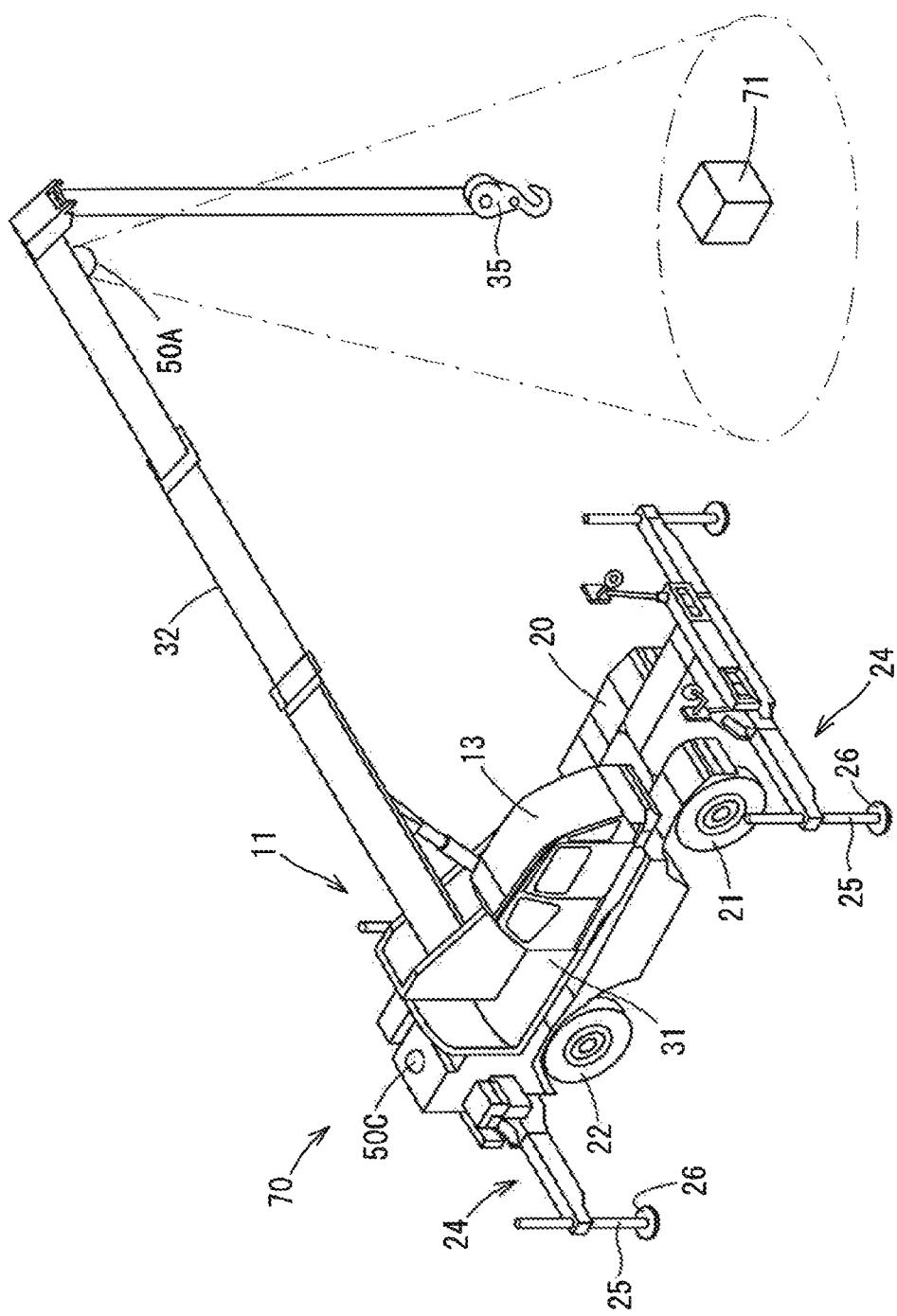
FIG. 9 is a perspective view of a crane vehicle 70 of Modification example 2.

The configuration of a crane vehicle 70 shown in FIG. 9 is the same as the configuration of the crane vehicle 10 described in the first embodiment, except that the crane vehicle 70 has a rotating body that changes the orientation of the antenna of the obstacle sensor 50A.

The input device 49 receives an instruction to select an obstacle detection mode for detecting obstacles around the load 71 during the operation of the crane device 12.

Figure 10:
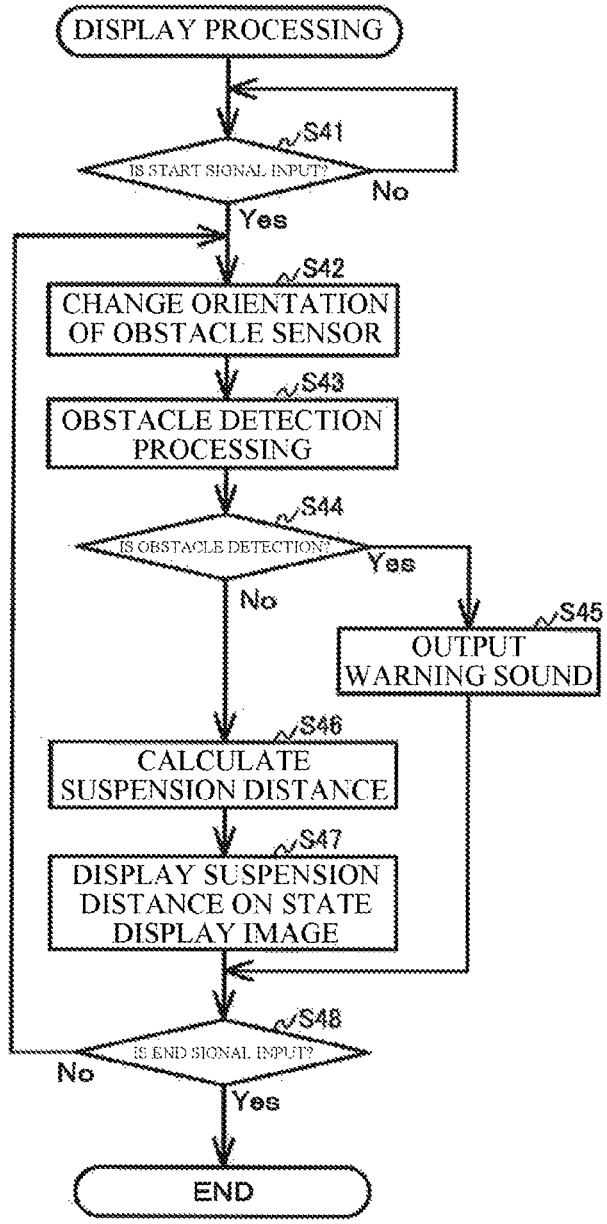
FIG. 10 is a flowchart of display processing of Modification example 2.

Hereinafter, the display processing executed by the controller 60 during the operation of the crane device 12 is described with reference to FIG. 10. The display processing is processing in which the presence/absence of obstacles around the load 71, the distance from the front end of the boom 32 to the load 71, or the like is displayed on a state display image showing the swiveling angle of the swivel base 31, the derricking angle of the boom 32, the length of the boom 32, and the like.

First, the controller 60 determines whether the operator has selected the obstacle detection mode by using the input device 49 (S41). Specifically, the controller 60 determines whether a start signal has been input from the input device 49. That is, the display processing is started when the operator has selected the obstacle display mode.

The controller 60 waits until a start signal is input (S41: No). When the controller 60 determines that the start signal has been input (S41: Yes), the controller 60 changes the orientation of the obstacle sensor 50A (S42). Specifically, the orientation of the obstacle sensor 50A is changed to the orientation in which the detection wave is irradiated toward the underneath of the front end of the boom 32.

Figure 6:
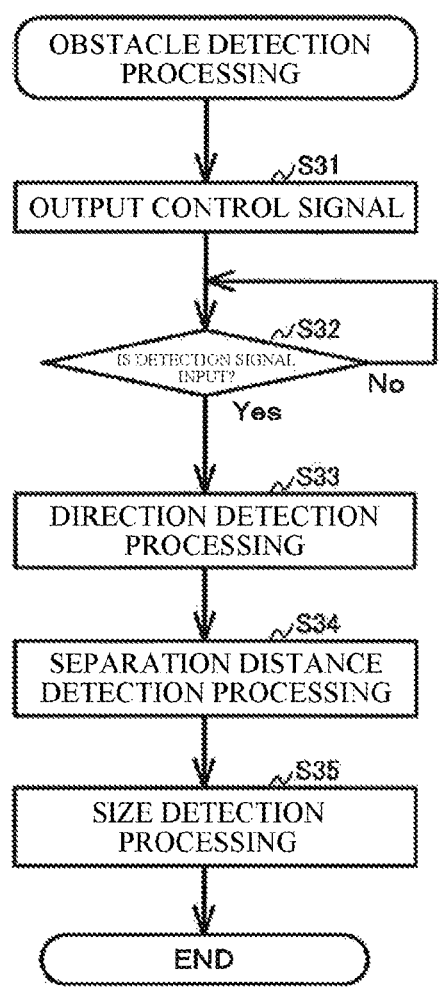
FIG. 6 is a flowchart of obstacle detection processing.

Subsequently, the controller 60 executes obstacle detection processing (S43). Specifically, the controller 60 outputs a control signal to the transmission/reception circuit 66 and receives a detection signal as in the processing of step S31 (FIG. 6). The controller 60 determines whether an obstacle exists around the load 71 based on the received detection signal (S44).

When the controller 60 determines that an obstacle exists around the load 71 (S44: Yes), the controller 60 causes the display 48 to display an image indicating that an obstacle exists around the load 71, or causes the speaker 68 to output a warning sound (S45). Moreover, whether the object is the load 71 or the obstacle is determined by, for example, the position of the detected object. For example, the controller 60 determines that the object located directly under the hook 35 is a "load" and the object existing around the "load" is an "obstacle".

Subsequently, the controller 60 determines whether the operator has input an instruction to end the obstacle detection mode by using the input device 49 (S48). Specifically, the controller 60 determines whether an end signal has been input from the input device 49. When the controller 60 determines that the end signal has not been input (S48: No), the controller 60 returns to the processing of step S42 and continues the display processing. On the other hand, when the controller 60 determines that the end signal has been input (S48: Yes), the controller 60 ends the display processing.

When the controller 60 determines that no obstacle exists in the processing of step S44 (S44: No), the controller 60 calculates a suspension distance being the distance to the load 71 (S46). The suspension distance is calculated from, for example, the time starting from the irradiation of the detection wave to the reception of the reflected wave reflected by the load 71.

The controller 60 displays the calculated suspension distance on the state display image showing the swiveling angle of the swivel base 31, the derricking angle of the boom 32, the length of the boom 32, and the like (S47). Subsequently, the controller 60 determines whether the end signal has been input from the input device 49 (S48). When the controller 60 determines that the end signal has not been input (S48: No), the controller 60 returns to the processing of step S42 and continues the display processing. On the other hand, when the controller 60 determines that the end signal has been input (S48: Yes), the controller 60 ends the display processing.

Operation and Effect of Modification Example 2

In this modification example, the obstacle sensor 50A arranged at the front end of the boom 32 can be used to detect the distance to the load 71 suspended by the crane device. In addition, an obstacle around the load 71 can be detected.

Modification Example 3

In this modification example, an example is described in which infrared sensors 52 for detecting infrared rays is arranged in addition to the obstacle sensor 50.

The infrared sensors 52 are arranged adjacent to the obstacle sensors 50A, 50B and 50C, respectively. That is, three infrared sensors 52 are arranged on the crane vehicle 10. The infrared sensor 52 corresponds to the "fourth sensor" of the present invention.

The infrared sensor 52 includes a lens for collecting incident infrared rays, a light receiving unit for receiving the infrared rays collected by the lens, and an amplifier circuit for amplifying and outputting a signal corresponding to the infrared rays received by the light receiving unit. The amplifier circuit is driven by the direct-current voltage supplied from the power supply circuit 65. That is, the infrared sensor 52 is arranged adjacent to the obstacle sensor 50, and thereby the power is supplied through the cable or the swivel connecting the obstacle sensor 50 and the control substrate.

A receiving unit may output a signal corresponding to the intensity of the received infrared ray, or may have a plurality of light receiving units. The infrared sensor 52 having a plurality of light receiving units outputs a signal corresponding to the difference in the intensity of the infrared rays received by each light receiving unit. That is, when an object to be detected such as a person who emits infrared rays moves, the infrared sensor 52 outputs a detection signal indicating that the object to be detected has been detected.

The region where the lens of the infrared sensor 52 performs light collection corresponds to the directional region of the obstacle sensor 50 being an antenna. That is, the lens of the infrared sensor 52 collects the infrared rays that are incident from the region where the obstacle sensor 50 mainly irradiates the detection wave. Therefore, the infrared sensor 52 detects the same region as the detection region of the obstacle sensor 50.

Display Processing

Figure 11:
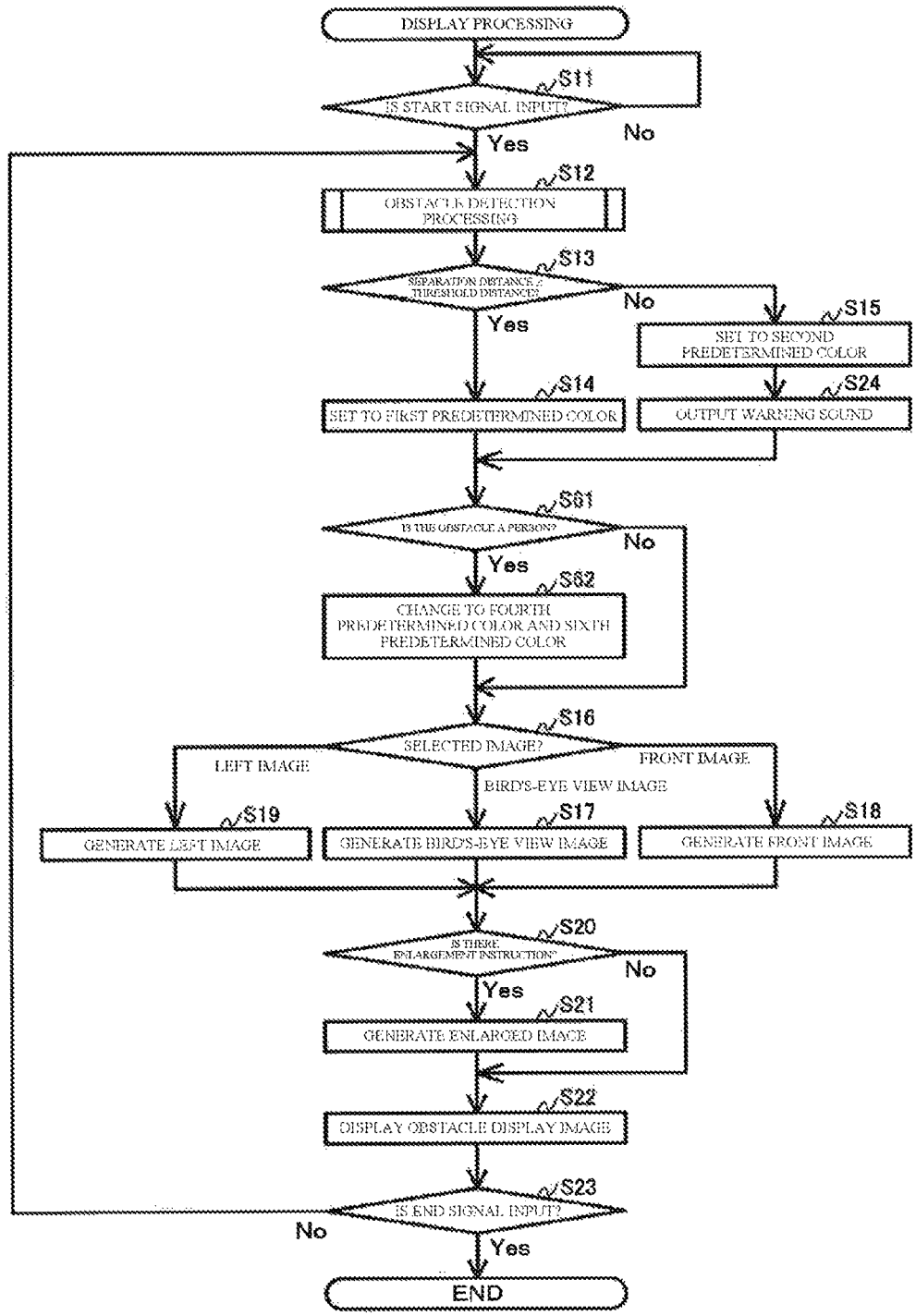
FIG. 11 is a flowchart of display processing of Modification example 3.

In this modification example, the controller 60 executes the display processing shown in FIG. 11 instead of the display processing shown in FIG. 5. Moreover, in the display processing shown in FIG. 11, the same processing as the display processing shown in FIG. 5 is denoted by the same reference characters and the description thereof is omitted.

The controller 60 executes the processing of steps S11 to S15 and S24 as in the first embodiment (display processing shown in FIG. 5). Subsequently, the controller 60 determines whether the obstacle detected by the obstacle sensor 50 is a "person" (S61). Specifically, the controller 60 calculates the position of the object to be detected that emits infrared rays in the same manner as in the first embodiment, based on the detection signals input from the plurality of infrared sensors 52. The controller 60 determines whether the calculated position of the object to be detected matches the position of the obstacle. Subsequently, the controller 60 determines whether the size of the obstacle detected by the obstacle sensor 50 is equal to or larger than the threshold value. The threshold value is previously stored in the memory 64. The controller 60 determines that the obstacle is a "person" when the position of the object to be detected matches the position of the obstacle and the size of the obstacle is equal to or larger than the threshold value. Moreover, the above-mentioned "determination of whether the obstacle is a person or not" is an example only and may be performed by other methods.

When the controller 60 determines that the detected obstacle is a person (S61: Yes), the controller 60 changes the second predetermined color (for example, yellow) set in step S15 to the fourth predetermined color (for example, red) different from the second predetermined color, and changes the first predetermined color (for example, blue) set in step S14 to a sixth predetermined color (for example, orange) different from the second predetermined color, the first predetermined color (for example, blue), and the fourth predetermined color (S62).

On the other hand, when the controller 60 determines that the detected obstacle is not a person (S61: No), the controller 60 skips the processing of step S62. Then, the controller 60 executes the processing of steps S16 to S23 as in the first embodiment.

Operation and Effect of Modification Example 3

In this modification example, the color of the obstacle object is varied depending on whether the obstacle is a person or not, thus enabling the user to easily recognize whether the obstacle is a person or not.

In addition, when the distance from the crane vehicle 10 to the obstacle is short and the obstacle is a person, the color of the obstacle object is changed from the second predetermined color (for example, yellow) to the fourth predetermined color (for example, red), thus enabling the operator to easily recognize that more attention is required.

Moreover, the configuration of this modification example may be added to Modification example 1. In that case, the fourth predetermined color is different from the second predetermined color and the third predetermined color, and the sixth predetermined color is different from the fifth predetermined color.

Modification Example 4

Figure 12:
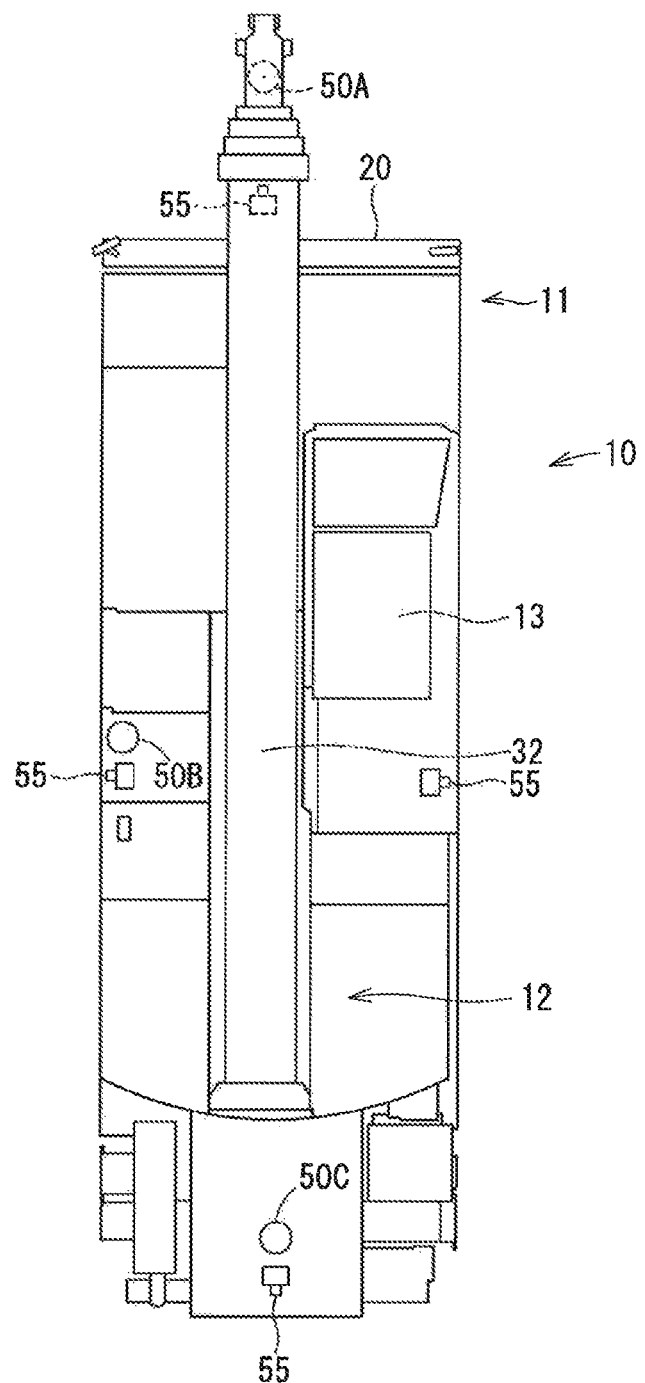
FIG. 12 is a schematic plan view of the crane vehicle 10 according to Modification example 4.

As shown in FIG. 12, the crane vehicle 10 of this modification example includes a plurality of (four in the illustrated example) cameras 55. The first camera 55 is arranged in the front part of the crane vehicle 10 to capture images in front of the crane vehicle 10. The second camera 55 is arranged at the rear side of the crane vehicle 10 to capture images back of the crane vehicle 10. The third camera 55 is arranged on the left side of the crane vehicle 10 to capture images on the left side of the crane vehicle 10. The fourth camera 55 is arranged on the right side of the crane vehicle 10 to capture images on the right side of the crane vehicle 10.

The camera 55 is electrically connected to the control substrate through a cable or a swivel. The camera 55 outputs the captured image as an image signal. The image signal output by the camera 55 is input to the controller 60. The controller 60 synthesizes a plurality of images represented by the input image signals to generate a bird's-eye view image of the periphery of the crane vehicle 10. Because the method by which the controller 60 generates a bird's-eye view image from a plurality of images is publicly known, detailed description thereof is omitted.

The controller 60 synthesizes the generated bird's-eye view images of the periphery of the crane vehicle 10 into the bird's-eye view image described in the embodiment, and displays the synthesized image on the display 48 as an obstacle display image. Alternatively, the controller 60 synthesizes the images captured by the camera 55 for capturing images in front of the crane vehicle 10 into the front image described in the embodiment, and displays the front image on the display 48 as an obstacle display image. Alternatively, the controller 60 synthesizes the images captured by the camera 55 for capturing images on the left side of the crane vehicle 10 into the left image described in the embodiment, and displays the left image on the display 48 as an obstacle display image.

Operation and Effect of Modification Example 4

In this modification example, in addition to the vehicle object and the obstacle object, the image of the periphery of the crane vehicle 10 is also added to the obstacle display image, thus enabling the operator to recognize the situation around the crane vehicle 10 more easily.

Other Modification Examples

In the above embodiment, an example is described in which no obstacle sensor 50 is arranged on the right side of the swivel base 31 on which the cabin 13 is arranged. However, the obstacle sensor 50 may also be arranged on the right side of the swivel base 31.

In addition, in the above-described embodiment, an example is described in which the boom 32 is located on the left side of the swivel base 31 and the cabin 13 is located on the right side of the swivel base 31. However, the boom 32 may also be located on the right side of the swivel base 31 and the cabin 13 may also be located on the left side of the swivel base 31.

Besides, in the above-described embodiment and modification examples, an example is described in which the user selects whether to execute the obstacle detection mode. However, the obstacle detection mode may always be executed.

In addition, in the above-described embodiment, an example is described in which the transmission/reception circuit 66 is mounted on the control substrate, the obstacle sensor 50 being an antenna is arranged on the boom 32 or the vehicle body 20, and the transmission/reception circuit 66 is electrically connected to the obstacle sensor 50 through a cable or a swivel. However, a transmission/reception module in which an antenna and the transmission/reception circuit 66 are integrated may also be used instead of the obstacle sensor 50 and the transmission/reception circuit 66.

Furthermore, in the above-described embodiment, an example is described in which the obstacle sensor 50 transmits the detection wave by the power supplied from the power supply circuit 65 arranged in the cabin 13. However, an antenna power supply circuit for supplying power to the obstacle sensor 50 may also be arranged in the vehicle body 20 separately from the power supply circuit 65. The antenna power supply circuit transforms the direct-current voltage supplied from the battery 27 into a predetermined direct-current voltage and outputs the direct-current voltage.

In addition, in the above-described embodiment, an example is described in which a signal corresponding to the reflected wave received by the obstacle sensor 50 is input to the controller 60 through a cable or a swivel. However, the obstacle sensor 50 and the controller 60 may be configured to be capable of wirelessly communicating with each other, and a signal corresponding to the reflected wave received by the obstacle sensor 50 may be input to the controller 60 by wireless communication. Specifically, the obstacle sensor 50 has a transmission antenna for wireless communication. A reception antenna (pattern antenna) for wireless communication is arranged in the control substrate. The signal output from the obstacle sensor 50 is input to the controller 60 by wireless communication, and thus noise can be prevented from being superimposed on the signal at the swivel.

Besides, in Modification example 4 described above, an example is described in which the image signal output by the camera 55 is input to the controller 60 through a cable or a swivel. However, the camera 55 and the controller 60 may be configured to be capable of wirelessly communicating with each other, and the image signal output by the camera 55 may be input to the controller 60 by wireless communication. Specifically, the camera 55 is electrically connected to the transmission antenna for wireless communication through a cable. A reception antenna (a pattern antenna or the like) for wireless communication is arranged in the control substrate. The image signal output by the camera 55 is input to the controller 60 by wireless communication. Thus, noise can be prevented from being superimposed on the image signal at the swivel.

Furthermore, in the above-described embodiment, the obstacle sensor 50 that transmits radio waves has been described. However, the obstacle sensor 50 may also irradiate light such as laser light. In that case, the obstacle sensor 50 includes a light emitting unit such as a light emitting diode for irradiating light, a light receiving unit such as a photodiode for receiving the light and outputting a voltage corresponding to the intensity of the received light, and an amplification unit for amplifying the voltage output by the light receiving unit and outputting the amplified voltage as a detection signal.

In addition, in the above-described embodiment, the obstacle sensor 50 that transmits radio waves has been described. However, the obstacle sensor 50 may also irradiate sound waves (including ultrasonic waves). In that case, an (ultra) ultrasonic wave sensor, a Doppler sensor, or the like is used as the obstacle sensor 50. Moreover, when an obstacle is detected by sound waves, a temperature sensor for temperature compensation such as a thermistor for detecting the outside air temperature is arranged on the crane vehicle 10.

The invention claimed is:

1. A crane vehicle, comprising:
   a traveling body on which a crane device is mounted;
   a driver seat arranged on one side in a width direction of the traveling body;
   a first sensor that outputs a signal corresponding to a distance to an obstacle located on the other side in the width direction;
   a controller; and
   a display,
   wherein:
   the controller creates a second object that indicates an obstacle detected by the first sensor,
   the controller displays an obstacle display image including a first object that represents the crane vehicle stored in a memory and the second object on the display,
   the distance between the first object and the second object corresponds to the distance detected by the first sensor,
   the controller places the second object on the obstacle display image in response to the location detected by the first sensor,
   the controller sets a color of the second object to a first predetermined color when the distance to the obstacle is equal to or greater than a threshold distance stored in the memory, and sets the color of the second object to a second predetermined color different from the first predetermined color when the distance to the obstacle is less than the threshold distance stored in the memory,
   the driver seat has a steering wheel for determining a steering angle of wheels of the traveling body, and
   the crane device further comprises:
      a second sensor for outputting a signal that corresponds to the steering angle of the steering wheel, and
      a third sensor for outputting a signal that corresponds to the speed of the traveling body, and further wherein:
      the controller determines whether the obstacle detected by the first sensor is a moving object or a fixed object from the signals input from the first sensor, the second sensor, and the third sensor, and
      sets the second predetermined color to a third predetermined color different from the second predetermined color in response to a determination that the object is a moving object.

2. The crane vehicle according to claim 1, further comprising an input device,
   wherein the controller receives, through the input device, a selection of one image from a bird's-eye view image viewed from above, a front image of a viewpoint directed forward, and a side image directed toward the other side, and
   displays the received image on the display as the obstacle display image.

3. The crane vehicle according to claim 2, wherein the controller receives, through the input device, an enlargement instruction instructing the enlargement of a partial region of the obstacle display image, and
   displays, in response to reception of the enlargement instruction, an enlarged image obtained by enlarging the region on the other side in the width direction of the traveling body on the display.

4. The crane vehicle according to claim 1, further comprising a speaker, wherein the controller causes the speaker to generate a warning sound when the distance to the obstacle is less than the threshold distance stored in the memory.

5. The crane vehicle according to claim 1, wherein:
   the crane device has a boom capable of being raised, lowered and stretched, the first sensor is arranged at a front end portion of the boom, and in response to reception of a signal output from the first sensor and corresponding to the distance from the front end of the boom to a load suspended by the boom, the controller displays the distance on the display.

6. The crane vehicle according to claim 1, further comprising a plurality of cameras for capturing images of the periphery of the traveling body, wherein the obstacle display image includes the images captured by the cameras.

7. A crane vehicle, comprising:

a traveling body on which a crane device is mounted;

a driver seat arranged on one side in a width direction of the traveling body;

a first sensor that outputs a signal corresponding to a distance to an obstacle located on the other side in the width direction;

a controller; and a display, wherein:

the controller creates a second object that indicates an obstacle detected by the first sensor, the controller displays an obstacle display image including a first object that represents the crane vehicle stored in a memory and the second object on the display, the controller places the second object on the obstacle display image in response to the location detected by the first sensor, the distance between the first object and the second object corresponds to the distance detected by the first sensor, the controller sets a color of the second object to a first predetermined color when the distance to the obstacle is equal to or greater than a threshold distance stored in the memory, and sets the color of the second object to a second predetermined color different from the first predetermined color when the stance to the obstacle is less than the threshold distance stored in the memory, further comprising a fourth sensor for receiving infrared rays incident from the other side in the width direction, wherein the controller determines whether the obstacle detected by the first sensor is a person or not in accordance with a signal input from the fourth sensor, and sets the second predetermined color to a fourth predetermined color different from the second predetermined color in response to a determination that the obstacle is a person.

\* \* \* \* \*